Oct. 7, 1947.　　　　E. E. ROGERS　　　　2,428,585
VENTURI FITTING
Filed Dec. 27, 1943

Edward E. Rogers INVENTOR.
BY
His Patent Attorney

Patented Oct. 7, 1947

2,428,585

UNITED STATES PATENT OFFICE 2,428,585

VENTURI FITTING

Edward E. Rogers, Bexley, Ohio, assignor to Curtiss-Wright Corporation, a corporation of Delaware Application December 27, 1943, Serial No. 515,676

4 Claims. (Cl. 285—105)

This invention relates to Venturi fittings and more particularly to an improved type of fitting for use in connection with the vent tubes of an aircraft.

In high speed vehicles and especially in modern airplanes there are numerous vent lines that extend through the skin covering to the external atmosphere and which are intended to have either a positive or negative pressure developed at their orifices for the purpose of causing fluids to enter or be withdrawn from the interior of the craft and be expelled into the air stream. Examples of apparatus making use of such Venturi installations include various types of navigation apparatus requiring a negative pressure for the operation of various component instruments; automatic control systems for the maintenance of lateral or longitudinal stability operating pneumatically; ventilation and drainage systems to remove spent air from cabins, accumulations of noxious fumes from interior compartments and even to provide for removal of body wastes of the individual members of the crew; and many others.

In prior practice it has generally been customary to merely extend the end of a vent line through the skin and to cut the extending end so that the orifice of the tube faced away from the approach direction of the relative air stream whereby air flowing about the tube created a negative pressure at the cut end and within the tube. This method is subject to definite objections based on the fact that the angle cut on the end of the tube is usually the result of guesswork on the part of some mechanic who makes the cut after the tube has been installed. In many instances the ends of the tubes have been carelessly cut and otherwise improperly installed resulting in a positive pressure being applied to the outlet when a negative pressure may have been desired, which mishap entirely defeats the purpose of the installation. Furthermore, a tube of circular section extending into the relative air stream is productive of disruption of the airflow to an unnecessarily great extent with resultant unwanted drag. This latter condition has been ameliorated to a certain extent by attempts to streamline the projecting tube end by enclosing the same in a metal shield of better aerodynamic shape but such composite makeshifts do not satisfactorily fill the requirements of an installation of this type.

It is therefore an object of the present invention to provide a Venturi fitting which may be of unitary form and having a contour of airfoil shape and with a surface extending substantially parallel to the chord of the airfoil shaped surface which is adapted to sealingly engage the fitting with a supporting surface, the said fitting having an opening originating in the contour and terminating inside and beyond the surface in a nipple, the said supporting surface having an opening therethrough adapted to pass the nipple, means associated with the fitting and support and alining said fitting with the support, and means associated with the nipple and engaging the support to secure the fitting to the support.

Other objects and advantages will be apparent from a study of the description that follows together with the drawings appended hereto, in which.

Figure 3:
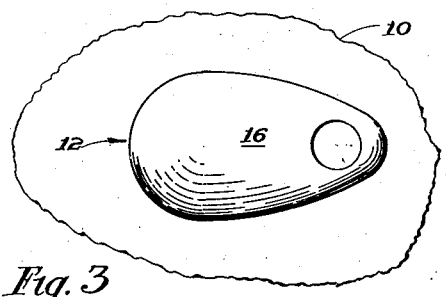
Fig. 3 is a bottom plan view of the form shown in Figs. 1 and 2.
Figure 4:
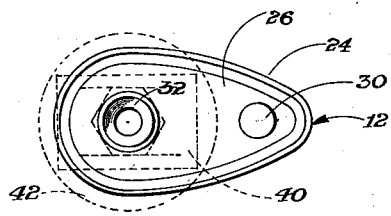
Fig. 4 is a top plan view of the same with the hose and clamp removed.
Figure 2:
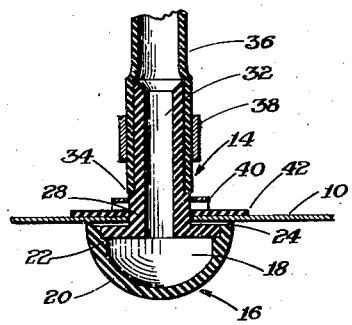
Fig. 2 is a view in transverse section of the same taken along the lines 2—2 of Fig. 1.
Figure 1:
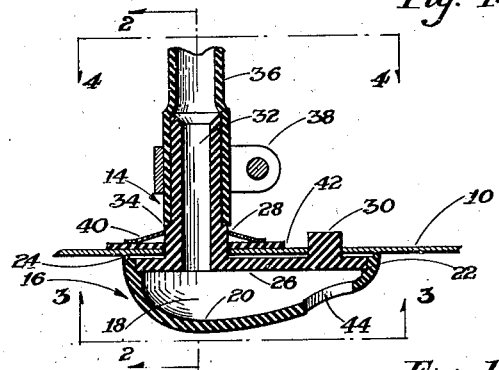
Fig. 1 is a view in longitudinal section of one form of the invention.

Referring to the drawings, specifically to the Figs. 1 to 4 inclusive, the form of the invention there shown is illustrated in connection with a portion 10 of the skin of an aircraft. In this embodiment, the fitting 12 is made of relatively non-resilient plastic material, for example cellulose acetate butyrate or black Tenite. The fitting is most conveniently formed in two sections 14 and 16, of which the lower section 16 resembles one-half of a teardrop and is hollowed out as at 18 to provide a wall 20 that terminates in a shoulder 22 and an upstanding lip 24 that extends entirely around the periphery of the section. The other, or upper section 14 of the fitting consists of a plate-like portion 26 which is formed integral with a tubular nipple 28 and a stud 30. This upper section is cemented to the lower section 16 at the shoulder 22 using a suitable adhesive. The nipple 28 is formed with a reduced diameter portion 32 that terminates at the shoulder 34 and is adapted to provide for the attachment of the end 36 of a hose. The latter may be held in leakage tight assembly with the portion 32 through the use of a conventional clamp 38 and serves as a means of connection between the fitting 12 and the apparatus or structure with which it is to be functionally associated.

At the point of installation of a Venturi fitting of this type, the aircraft skin 10 is pierced by two openings of different relative size, one being of size to readily pass the nipple 28 and the other of a size and proper spacing to receive the stud 30. The two openings should preferably have their centers located on a line parallel to the local direction of airflow at the installation point and this will predetermine the alinement of the fitting so that it cannot be installed incorrectly. Thus it will necessarily attack the air stream in the proper attitude so that the well known aerodynamic reactions will be developed on its external surface.

The fitting 12 is retained in contact with the skin 10 by any suitable means but the preferred fastening method employs a resilient fastener of the Tinnerman type as shown at 40 which can be slipped over the nipple before attachment of the hose and then pressed down until the fitting is gripped tightly and is held snugly in place. A "speed nut" fastener of this type is formed of spring steel which metal in contact with aluminum (of which the skin sheet 10 may be constituted) in the presence of salt water develops an electrolytic reaction. To avoid the harmful results of such an action, a washer 42 formed of a suitable non-metallic material is inserted between the fastener 40 and the skin 10 to keep them out of contact and to prevent the harder material of the fastener from damaging the aluminum. At the same time the fastener exerts sufficient force through the nipple to draw the surface of lip 24 snugly against the outer surface of skin 10.

When the fitting is installed and is in use the air stream impinges on the nose of the airfoil-like contour of the fitting and creates an area of low or negative air pressure about the aft surface of the fitting in which the opening 44 is located. The magnitude of the pressure within the negative pressure area will not be uniform over the entire surface of the fitting that is enveloped by the negative pressure area. Nevertheless, the pressure throughout this area will be below the pressure within the fitting and nipple and, therefore, air will flow as by suction through the fitting and into the air stream. The fitting can be made to produce a positive flow of air therethrough by locating the opening 44 in the nose of the fitting so that a portion of the air impinging upon the nose area will flow through the opening into the fitting and will be discharged through the nipple 28.

Figure 5:
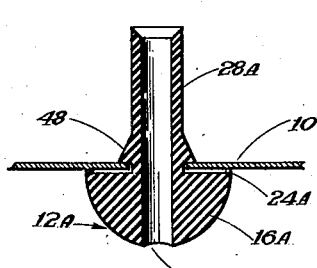
Fig. 5 is a transverse section of a second form of the invention as taken along the lines 5—5 of Fig. 6.
Figure 6:
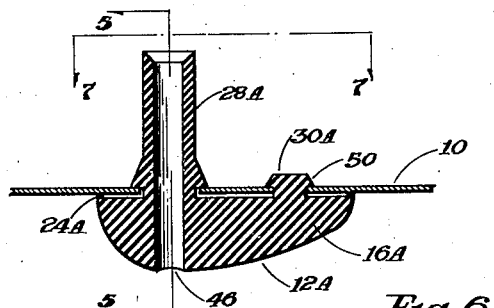
Fig. 6 is a longitudinal section of the second form.
Figure 7:
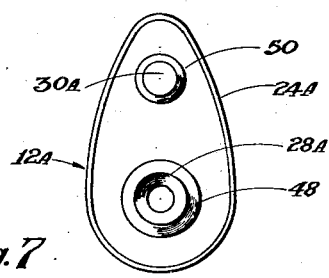
Fig. 7 is a top plan view of the form shown in Figs. 5 and 6.

In the second embodiment of the invention illustrated by Figs. 5 to 7 inclusive, the fitting 12A is formed as a unitary member of some more flexible material such as soft rubber or resilient plastic. In this case the nipple 28A and the stud 30A are formed of the integral material of the fitting and in this case too, the lower body portion 16A is of solid construction. Due to the elimination of the hollow interior, the central duct running through the nipple 28A is continued through the lower body portion 16A to intersect the external contoured surface and produce an exit orifice 46 which may be centered on the extended axis of the nipple or offset rearwardly therefrom as desired. In either case, the functioning will be substantially as in the first embodiment.

However, the formation of the fitting from flexible material allows a construction which provides integral means for fastening the fitting in place so that the Tinnerman fastener may be dispensed with entirely. This integral fastening means may take the form of cones 48 and 50 respectively surrounding the nipple 28A adjacent to the base thereof, and capping the stud 30A. In attaching the fitting to the skin 10, the cones are pressed or drawn through their respective openings in the skin, whereupon they expand to original shape and lock the fitting in place with the lip 24A in snug contact with the outer surface of the skin. While these fastening portions have been described as cones, they could of course be of any shape suitable for the purpose.

Minor modifications such as the foregoing would not change the basic substance of my invention and all such modifications are intended to be embraced within the scope of the appended claims.

What I claim is:

1. As an article of manufacture, a Venturi fitting consisting of a body having a first surface contoured to develop a negative pressure as the result of aerodynamic action thereon, a second surface extending into engagement with the first and forming a closed envelope therewith, mounting means projecting from said second surface, a stud formed upon said second surface spaced from and cooperating with said mounting means in preventing rotation of said fitting thereabout, and a fluid passageway traversing respectively the said first surface from its area of negative pressure, the said body and the said mounting means.

2. As an article of manufacture, a terminal fitting for a vent tube comprising a body of ovate section, a mounting base conforming to said section, a contoured surface intersecting the periphery of said base and projecting therebeyond to provide a peripheral sealing lip, a mounting member projecting from said base, a fluid passageway extending consecutively through said mounting member, said body and said contoured surface and fastening means associated with said mounting member adapted to attach said fitting to a mounting surface.

3. In an aircraft having a pair of spaced openings through the skin thereof, a surface fitting for aircraft adapted for installation exteriorly of said openings to induce suction within a tubular conduit by the action of the airstream to which said fitting is addressed, comprising a body having an outwardly-directed surface of a pressure-varying configuration and an inwardly-directed nipple for insertion through one of said openings and attachment to the aircraft, coupling means associated with said inwardly directed nipple for attachment to a tubular conduit, an inwardly directed stud formed upon said body to engage the second of said skin openings to cooperate with said nipple in maintaining the position of said body upon said aircraft skin, and a passageway extending between said conduit, said nipple and said externally directed body surface.

4. In aircraft, a terminal fitting adapted to be addressed to the airstream to induce flow within a conduit, comprising a body having a contoured outer surface, a relatively flat inwardly directed surface, nipple means formed upon said inwardly directed surface for extension through and attachment about an opening in the external skin of an aircraft, fastening means associated with said nipple means for the fastening of a conduit terminal thereto, a stud formed upon said inwardly directed surface spaced from and cooperating with said nipple means by engagement with a further opening in the said aircraft skin, and a continuous passageway extending through said body and said nipple means open to both said conduit and said outer surface adapted to induce flow in a predetermined direction through said conduit.

EDWARD E. ROGERS.

REFERENCES CITED

The following references are of record in the file of this patent:

UNITED STATES PATENTS

| Number | Name | Date |
| --- | --- | --- |
| 1,341,828 | Volckhausen | June 1, 1920 |
| 1,485,526 | Pulverman | Mar. 4, 1924 |
| 735,078 | Felsing et al. | Aug. 4, 1903 |
| 1,819,074 | Clason | Aug. 18, 1931 |
| 2,105,311 | Clason | Jan. 11, 1938 |